(12) United States Patent
Chang et al.

(10) Patent No.: US 9,713,037 B2
(45) Date of Patent: Jul. 18, 2017

(54) WIRELESS COMMUNICATION DEVICE AND METHOD OF DETERMINING TRANSMISSION RATE OF WIRELESS COMMUNICATION DEVICE

(71) Applicant: REALTEK SEMICONDUCTOR CORPORATION, Hsinchu (TW)

(72) Inventors: Wei-Hsuan Chang, Taipei (TW); Chung-Yao Chang, Hsinchu County (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 220 days.

(21) Appl. No.: 14/462,905

(22) Filed: Aug. 19, 2014

(65) Prior Publication Data

US 2015/0189537 A1    Jul. 2, 2015

(30) Foreign Application Priority Data

Jan. 2, 2014  (TW) .............................. 103100114 A (51) Int. Cl.
| | | |
|---|---|---|
| H04W 28/22 | (2009.01) | |
| H04L 12/811 | (2013.01) | |
| H04L 12/825 | (2013.01) | |
| H04W 74/08 | (2009.01) | |
| H04W 28/04 | (2009.01) | |

(52) U.S. Cl.
CPC ............. *H04W 28/22* (2013.01); *H04L 47/25* (2013.01); *H04L 47/38* (2013.01); *H04W 28/044* (2013.01); *H04W 28/046* (2013.01); *H04W 74/0816* (2013.01); *H04W 74/0825* (2013.01)

(58) Field of Classification Search
CPC ......... H04L 47/25; H04L 47/38; H04L 47/10; H04L 1/0002; H04L 1/1816;
(Continued)

(56) References Cited

U.S. PATENT DOCUMENTS

2004/0102177 A1  5/2004  Otsuka
2005/0086569 A1*  4/2005  Hiddink ................ H04L 1/0002
                                                                  714/749
(Continued)

FOREIGN PATENT DOCUMENTS

EP          1524808       12/2012
WO     WO 2011134183    11/2011

OTHER PUBLICATIONS

Office Action for the counterpart TW application 103100114 dated Aug. 14, 2015.
(Continued)

*Primary Examiner* — Kwang B Yao
*Assistant Examiner* — Ricardo Castaneyra
(74) *Attorney, Agent, or Firm* — WPAT, P.C., Intellectual Property Attorneys; Anthony King (57) ABSTRACT

This invention discloses a wireless communication device and a method of determining a target set of transmission rates of the wireless communication device. The wireless communication device transmits data packets according to a plurality of transmission rates included in the target set of transmission rates. The method includes steps of: providing a plurality of candidate sets of transmission rates; transmitting a plurality of data packets according to a primary set of transmission rates; counting retry times of the data packets in a predetermined period of time and generating a counting result; and selecting one of the candidate sets of transmission rates according to the counting result to be the target set of transmission rates.

24 Claims, 11 Drawing Sheets (58) Field of Classification Search
CPC ... H04L 1/0006; H04L 1/0003; H04L 1/0009; H04L 1/1819; H04L 1/1812; H04W 28/22; H04W 28/18; H04W 24/02; H04W 74/08; H04W 74/0816; H04W 74/0825; H04W 74/00
See application file for complete search history.

(56) References Cited

U.S. PATENT DOCUMENTS

| | | | |
|---|---|---|---|
| 2008/0117814 A1* | 5/2008 | Popescu | H04L 47/10 370/230 |
| 2010/0150096 A1* | 6/2010 | Choi | H04L 1/0025 370/329 |
| 2013/0060898 A1 | 3/2013 | Tanaka et al. | |
| 2014/0133303 A1* | 5/2014 | Jia | H04L 1/0002 370/232 |
| 2016/0036618 A1* | 2/2016 | Einhaus | H04L 1/0003 370/329 |

OTHER PUBLICATIONS

Search Report for the counterpart TW application 103100114 dated Aug. 14, 2015.
English abstract translation of the Office Action for the counterpart TW application 103100114 dated Aug. 14, 2015.

* cited by examiner

Fig. 1

| Set of transmission rates | Initial transmission rate | First retry transmission rate | Second retry transmission rate | Third retry transmission rate |
|---|---|---|---|---|
| T201 | R210 | R211 | R212 | R213 |
| T202 | R220 | R221 | R222 | R223 |
| T203 | R230 | R231 | R232 | R233 |
| T204 | R240 | R241 | R242 | R243 |

| Transmission rate | R210 | R211 | R212 | R213 |
|---|---|---|---|---|
| Number of data packets | 30 | 140 | 50 | 10 |

Fig. 4

| Transmission rate | R210 | R211 | R212 | R213 |
|---|---|---|---|---|
| Number of data packets | 20 | 30 | 30 | 150 |

| Set of transmission rates | Initial transmission rate | First retry transmission rate | Second retry transmission rate | Third retry transmission rate |
|---|---|---|---|---|
| T701 | 0 | 0 | 1 | 2 |
| T702 | 0 | 0 | 0 | 1 |
| T703 | 0 | 1 | 1 | 2 |
| T704 | 0 | 1 | 2 | 2 |

| T901 | ALL (54M, 48M, 36M, 24M, 18M, 12M, 9M, 6M) |
|------|--------------------------------------------|
| T902 | 54M, 48M                                   |
| T903 | 54M, 48M, 36M, 24M                         |
| T904 | 36M, 24M, 18M, 12M, 9M, 6M                 |

Fig. 9

| Transmission rate      | 54M | 54M | 48M | 36M |
|------------------------|-----|-----|-----|-----|
| Number of data packets | 50  | 120 | 30  | 20  |

Fig. 10

| Set of transmission rates | Initial transmission rate | First retry transmission rate | Second retry transmission rate | Third retry transmission rate |
|---|---|---|---|---|
| T1101 | 0 | 0 | 0 | 2 |
| T1102 | 0 | 0 | 1 | 4 |
| T1103 | 0 | 1 | 4 | 6 |
| T1104 | 0 | 2 | 5 | 8 |
| T1105 | 0 | 4 | 8 | 12 |

Fig. 11

| Transmission rate | MCS31 | MCS31 | MCS30 | MCS27 |
|---|---|---|---|---|
| Number of data packets | 30 | 40 | 90 | 120 |

Fig. 12

| Transmission rate | MCS27 | MCS27 | MCS26 | MCS24 |
|---|---|---|---|---|
| Number of data packets | 30 | 40 | 90 | 120 |

| Transmission rate | MCS27 | MCS27 | MCS26 | MCS24 |
|---|---|---|---|---|
| Number of data packets | 60 | 120 | 50 | 20 |

Fig. 15

| Transmission rate | MCS27 | MCS27 | MCS26 | MCS24 |
|---|---|---|---|---|
| Number of data packets | 120 | 120 | 25 | 10 |

Fig. 16

WIRELESS COMMUNICATION DEVICE AND METHOD OF DETERMINING TRANSMISSION RATE OF WIRELESS COMMUNICATION DEVICE

BACKGROUND OF THE INVENTION

1. Field of the Invention

This invention relates to a wireless communication device and a method of determining transmission rates of a wireless communication device, especially to a wireless communication device and its associated method that adaptively select transmission rate according to the conditions of the communication environment.

2. Description of Related Art

In a wireless communication system, a system is typically provided with a plurality of transmission rates. The selection of transmission rate depends on a variety of conditions. When a receiving end is far away from the transmitting end, the transmission rate must be low so that it is easier for the receiving end to receive data packets. On the other hand, when the receiving end is close to the transmitting end but there is much environmental interference or another wireless device is competing for the access to this channel, a high transmission rate is better because a high transmission rate shortens the transmission time of a data packet so that environmental interference and interference or collision from the wireless signals of other wireless devices are less likely to happen. Therefore, an appropriate transmission rate adjusting method is critical to a wireless transmission system.

In a wireless communication system, an appropriate transmission rate, sufficient transmission power, and good signal quality are essential for a data packet to be correctly transmitted from the transmitting end to the receiving end. If the transmission power and the signal quality do not change, the transmission rate must be properly adjusted to meet the requirement at the receiving end so data packets can be correctly transmitted to the receiving end. Many wireless communication systems have a retry mechanism. In the 802.11 standard, a transmission method that uses carrier-sense multiple-access, collision avoidance (CSMA/CA) with acknowledgement (ACK) is adopted. In this method the transmitting end waits for a period of time to detect whether there are other signals in the air before transmitting a data packet, and transmits the data packet if no transmission of other data packets at that time is confirmed. After the data packet is transmitted, the transmitting end will transmit the data packet again if an ACK packet from the receiving end is not received after a certain period of time, implying a failure transmission of the data packet. Reasons for the receiving end not being able to receive the data packet may be many but are basically classified into two main types. The first type is that a signal-to-noise ratio (SNR) of the data packet received at the receiving end is too low so the receiving end cannot receive the data packet correctly. The second type is that the transmitted data packet encounters either interference or collision with wireless signals from other wireless devices so the receiving end cannot receive the data packet correctly.

If it is the first case, the transmitting end must transmit the data packet at a lower transmission rate. The requirement for SNR at the receiving end can be lower due to a lower transmission rate; therefore, compared to a higher transmission rate, the data packet at a lower transmission rate is more likely to be correctly received. Another solution to the first case is to increase the transmission power, which is equivalent to increasing the SNR at the transmitting end, so the data packet which were not received correctly can then be received correctly. If it is the second case, the transmission rate should not be lowered. If the transmission rate is lowered, collision probability will be increased due to a longer transmission time in the air of the data packet.

SUMMARY OF THE INVENTION

In consideration of the imperfections of the prior art, an object of the present invention is to provide a wireless communication device and a method of determining transmission rates of a wireless communication device, so as to make an improvement to the prior art.

The present invention discloses a method of deciding a target set of transmission rates of a wireless communication device, which transmits data packets according to a plurality of transmission rates of the target set of transmission rates. The method comprises: providing a plurality of candidate sets of transmission rates; transmitting a plurality of data packets according to a primary set of transmission rates; counting retry times of the data packets in a predetermined time period and generating a counting result accordingly; and selecting one of the candidate sets of transmission rates to be the target set of transmission rates according to the counting result.

The present invention also discloses a wireless communication device, which comprises: a storage unit for storing a plurality of candidate sets of transmission rates, each comprising a plurality of transmission rates; a high-frequency transceiver circuit; and a processing unit, coupled to the storage unit and the high-frequency transceiver circuit, for accessing the sets of transmission rates and controlling the high-frequency transceiver circuit to transmit a plurality of data packets. The processing unit comprises a primary transmission rate set determining module for selecting one of the candidate sets of transmission rates to be a primary set of transmission rates, wherein the processing unit controls the high-frequency transceiver circuit to transmit a part of the data packets according to the primary set of transmission rates; a retry packet detection module for counting retry times of the data packets to generate a counting result; and a transmission rate set determining module for selecting one of the candidate sets of transmission rates to be a target set of transmission rates according to the counting result, wherein the processing unit controls the high-frequency transceiver circuit to transmit the remaining data packets according to the target set of transmission rates.

The wireless communication device and the method of determining the transmission rates of the wireless communication device of the present invention are able to detect the current conditions of the communication environment and thus select a proper transmission rate to transmit data packets. In comparison with the prior art, the wireless communication device and the method of determining the transmission rate of the wireless communication device of the present invention decides the proper transmission rate according to the complexities of the communication environment, such as the collision degree of data packets, and the transmission rate and the signal strength of another communication device, so the communication quality of the wireless transmission can be further enhanced.

These and other objectives of the present invention will no doubt become obvious to those of ordinary skill in the art

DETAILED DESCRIPTION OF THE PREFERRED EMBODIMENTS

The following description is written by referring to terms of this invention field. If any term is defined in the specification, such term should be explained accordingly. Besides, the connection between objects or events in the following embodiments can be direct or indirect provided that these embodiments are still applicable under such connection. Said "indirect" means that an intermediate object or a physical space exists between the objects, or an intermediate event or a time interval exists between the events. The present invention discloses a wireless communication device and a method of determining transmission rates of a wireless communication device, and the detail known in this field will be omitted if such detail has little to do with the features of the present invention. People of ordinary skill in the art can choose components or steps equivalent to those described in this specification to carry out the present invention, which means that the scope of this invention is not limited to the embodiments in the specification. On account of that some or all elements of said device invention could be known, the detail of such elements will be omitted provided that this omission nowhere dissatisfies the specification and enablement requirements. Besides, said method invention can be in the form of firmware and/or software which could be carried out by the device of this invention or the equivalent thereof; hence, the following description on the method invention will focus on the processes and steps instead of the hardware without dissatisfying the specification and enablement requirements.

Figure 1:
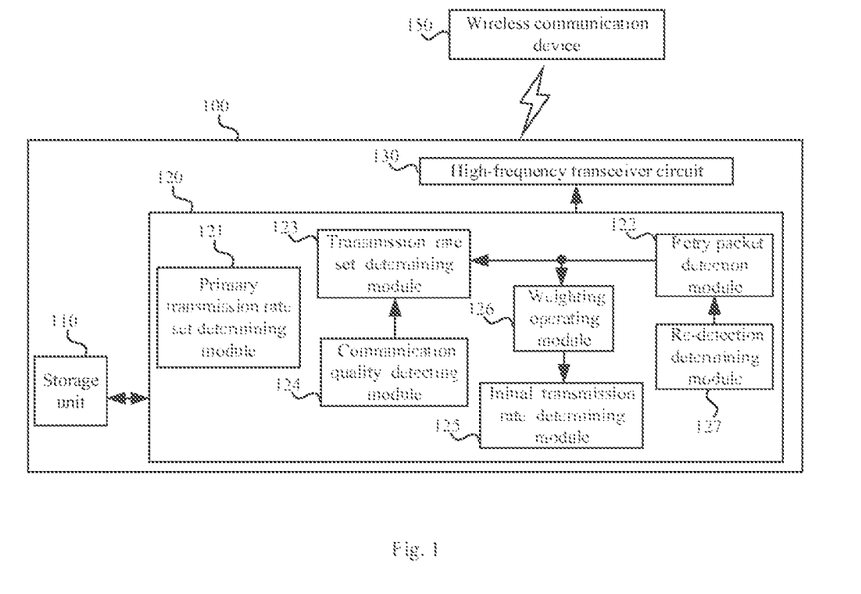
FIG. 1 illustrates the block diagram of a wireless communication device according to an embodiment of the present invention.
Figure 2:
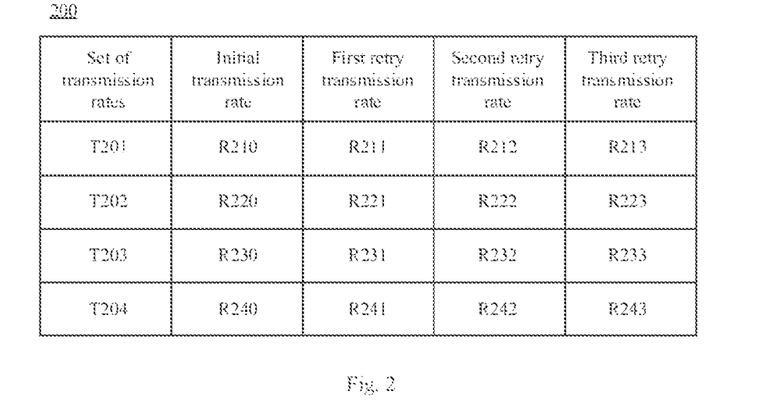
FIG. 2 illustrates plural sets of transmission rates according to an embodiment of the present invention.

Please refer to FIG. 1, illustrating the block diagram of a wireless communication device according to an embodiment of the present invention. The wireless communication device 100 comprises a storage unit 110, a processing unit 120, and a high-frequency transceiver circuit 130. The storage unit 110 stores a plurality of candidate sets of transmission rates. The processing unit 120 selects a target set of transmission rates from the candidate sets of transmission rates, and then controls the high-frequency transceiver circuit 130 to transmit data packets to another wireless communication device 150 according to the plurality of transmission rates comprised in the target set of transmission rates. The processing unit 120 may be a micro control unit (MCU) or a central processing unit (CPU). In a preferred embodiment, if the wireless communication device 100 is a portable mobile device, such as a cell phone, a tablet, or a laptop, the processing unit 120 is the processing unit of the portable mobile device. The processing unit 120 comprises a primary transmission rate set determining module 121, a retry packet detection module 122, a transmission rate set determining module 123, a communication quality detecting module 124, an initial transmission rate determining module 125, a weighting operating module 126, and a re-detection determining module 127. Please refer to FIG. 2, illustrating plural sets of transmission rates according to an embodiment of the present invention. The table 200 comprises 4 sets of transmission rates T201~T204, each comprising an initial transmission rate and a plurality of retry transmission rates. When the wireless communication device 100 initially transmits a data packet, the processing unit 120 controls the high-frequency transceiver circuit 130 to transmit at the initial transmission rate. If the initial transmission fails, the processing unit 120 further controls the high-frequency transceiver circuit 130 to transmit the same data packet again at the first retry transmission rate, and so forth. For example, if the processing unit 120 selects the set of transmission rates T201 as the current set of transmission rates, the wireless communication device 100 will use the transmission rate R210 to transmit a data packet for the first time. If the first transmission fails, the wireless communication device 100 transmits the same data packet again at transmission rates R211, R212 and R213 until the receiving end replies an acknowledgement of successful transmission. The table 200 records the absolute transmission rate; for example, R210 strands for 54 MHz and R211 stands for 48 MHz. The retry times in the table 200 are merely illustrated as examples, and may be more in practical implementations.

Figure 3:
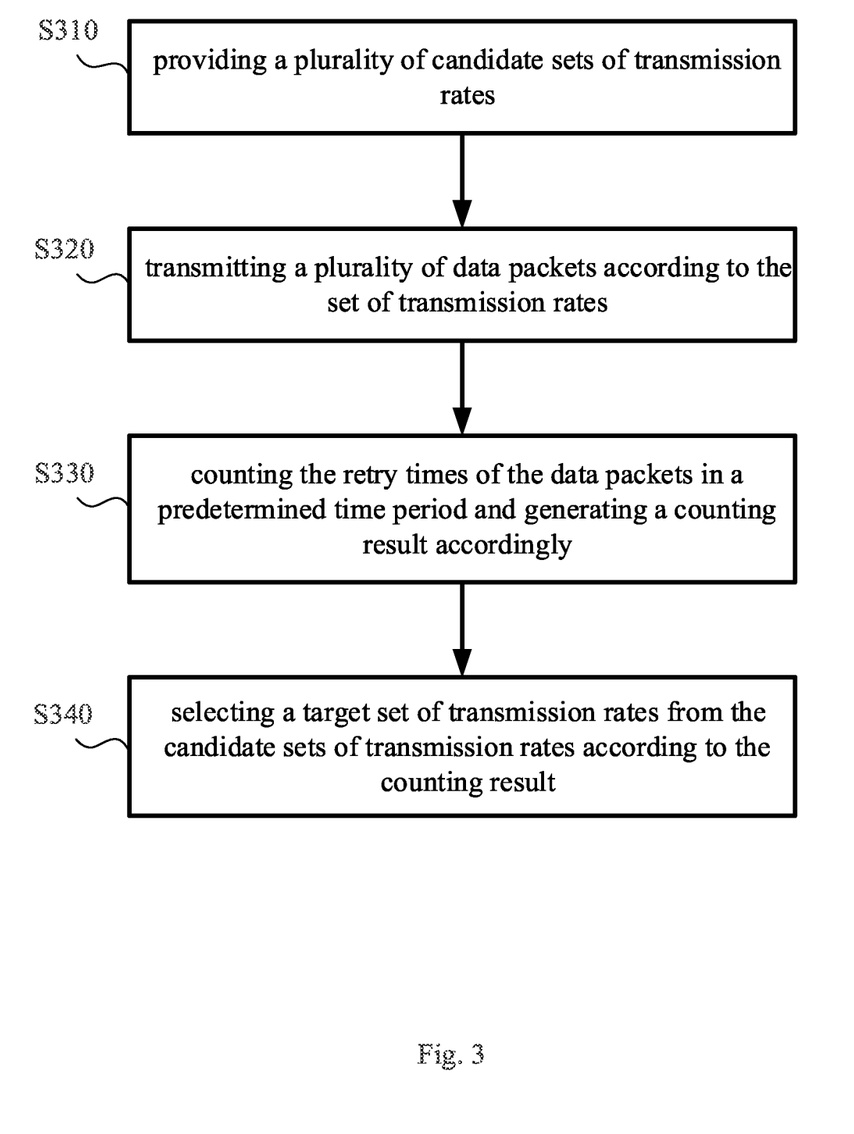
FIG. 3 illustrates a flow chart of determining the set of transmission rates of a wireless communication device according to an embodiment of the present invention.
Figure 4:
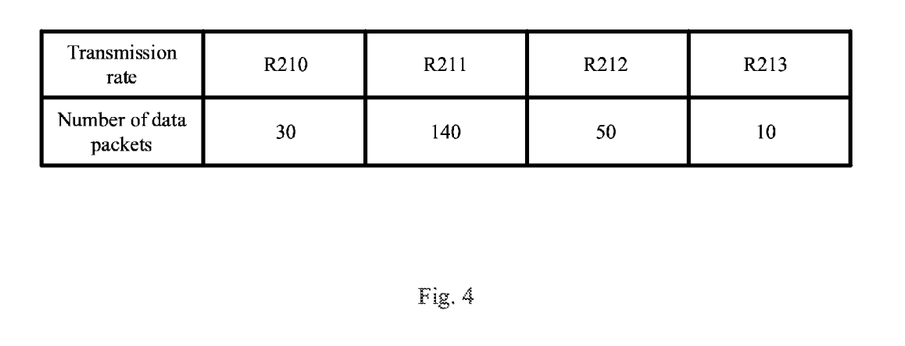
FIG. 4 illustrates a counting result of data packet transmission times according to one embodiment of the present invention.

Please refer to FIG. 3, illustrating a flow chart of determining the set of transmission rates of a wireless communication device according to an embodiment of the present invention. Please also refer to FIG. 1 to understand this embodiment better. Firstly, a plurality of candidate sets of transmission rates are provided (step S310). The candidate sets of transmission rates can be the sets of transmission rates illustrated in FIG. 2 and are stored in the storage unit 110. Then the primary transmission rate set determining module 121 selects one set of transmission rates from the plurality of sets of transmission rates in table 200 to be a primary set of transmission rates. For example, if the set of transmission rates T201 is selected, the high-frequency transceiver circuit 130 then transmits a plurality of data packets according to the set of transmission rates T201 (step S320). The primary set of transmission rates selected by the primary transmission rate set determining module 121 must have at least one retry transmission rate that is the same as the initial transmission rate. During the transmission, some data packets may be successfully transmitted at their first transmissions and some may not be successfully transmitted until one or more retires are conducted. The retry packet detection module 122 counts the retry times of the data packets in a predetermined time period via the high-frequency transceiver circuit 130 and generates a counting result accordingly (step S330). Please refer to FIG. 4, illustrating a counting result of data packet transmission times according to one embodiment of the present invention. As shown in FIG. 4, 30 data packets can be successfully transmitted at the initial transmission rate, and the numbers of data packets that requires one retry, two retries and three retires are 140, 50 and 10 respectively. Assuming that the four transmission rates R210~R213 of the set of transmission rates T201 respectively represent a high transmission rate, a high transmission rate, a medium transmission rate, and a low transmission rate, the counting result of FIG. 4 indicates that the low success rate of the first time transmission is probably due to collisions in that circumstance. Most data packets, however, can be successfully transmitted at a first retry, but there are still data packets encounter collisions where a second or even a third retry is required for a successful transmission.

Next, the transmission rate set determining module 123 selects a target set of transmission rates from the candidate sets of transmission rates listed in table 200 according to the counting result, and the target set of transmission rates will be employed by the high-frequency transceiver circuit 130 for transmitting the remaining data packets (step S340). In this step, the transmission rate set determining module 123 decides the target set of transmission rates based on whether the number of data packets transmitted at a high transmission rate exceeds a threshold value, such as 70% of total data packet. A higher collision probability is implied when the number of data packets transmitted at a high transmission rate exceeds the threshold value. Taking the counting result of FIG. 4 for example, the number of data packets transmitted at high transmission rates is 170, which exceeds the threshold value (230×0.7=161), so the transmission rate set determining module 123 selects a set of high transmission rates; otherwise, a set of low transmission rates will be selected. An average of all transmission rates of the set of high transmission rates is higher than an average of all transmission rates of the set of low transmission rates. Taking table 200 for example. If the sets of transmission rates T201 and T202 are sets of high transmission rates and the sets of transmission rates T203 and T204 are sets of low transmission rates, an average of all transmission rates of the set of transmission rates T201 or T202 is higher than an average of all transmission rates of the set of transmission rates T203 or T204. When the transmission rate set determining module 123 decides a set of high transmission rates, the set of transmission rates T201 or the set of transmission rates T202 will be selected; on the contrary, when the transmission rate set determining module 123 decides a set of low transmission rates, the set of transmission rates T203 or the set of transmission rates T204 will be selected. In this step, after the target set of transmission rates is decided, the processing unit 120 controls the high-frequency transceiver circuit 130 to continue transmitting the remaining data packets according to the target set of transmission rates. To be more specific, when initially connected with the wireless communication device 150, the wireless communication device 100 temporarily transmits a part of the total data packets according to a primary set of transmission rates, and then decides, based on the retry times of the transmitted data packets, a target set of transmission rates that will then be employed to transmit the remaining data packets.

Figure 5:
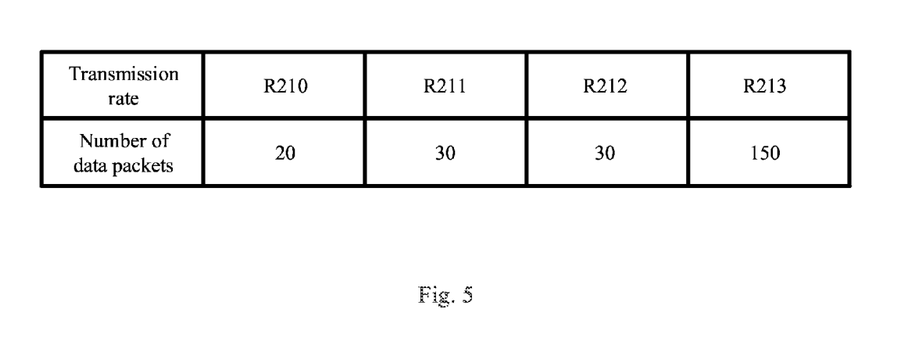
FIG. 5 illustrates an example of the counting result of the data packets transmission times according to the present invention.

If the counting result of the step S330 is shown as FIG. 5, where the number of data packets transmitted at high transmission rate is 50 (<161), suggesting a communication environment of insufficient SNR, which may probably be caused by a far distance between the wireless communication device 100 and the wireless communication device 150. As a result, in step S340 the transmission rate set determining module 123 will select a set of low transmission rates such as the set of transmission rates T203 for a communication environment of long distance transmission. The transmission rates R230~R233 may respectively represent a high transmission rate, a medium transmission rate, a low transmission rate, and a low transmission rate. Data packets are more easily transmitted to a distant device by adopting a set of transmission rates whose transmission rates decrease fast as the retry times increase.

Figure 6:
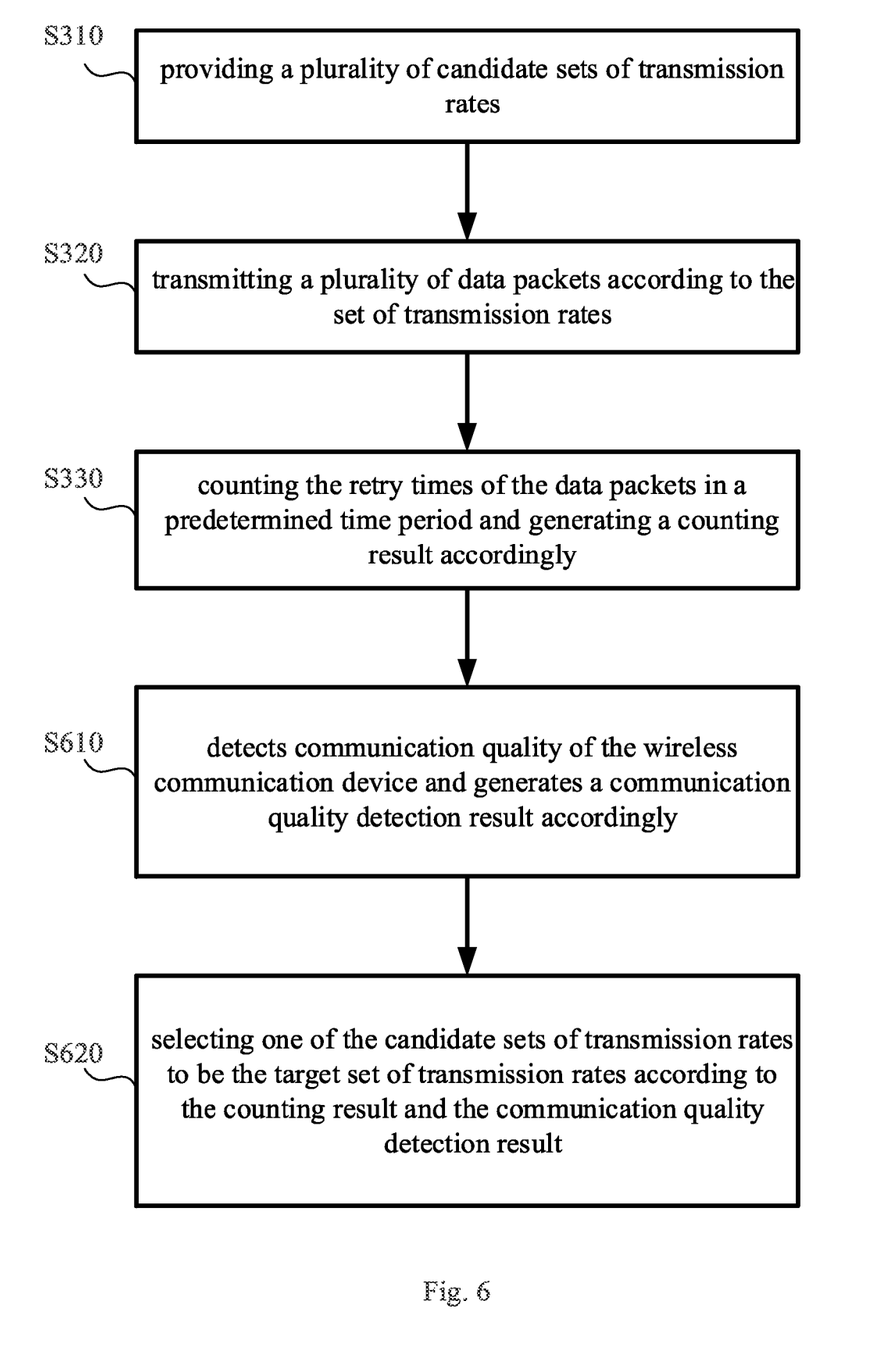
FIG. 6 illustrates a flow chart of deciding a set of transmission rates of a wireless communication device according to another embodiment of the present invention.

Please refer to FIG. 6, illustrating a flow chart of deciding a set of transmission rates of a wireless communication device according to another embodiment of the present invention. In addition to the steps of FIG. 3, this embodiment further includes the following steps.

Step S610: the communication quality detecting module 124 detects communication quality of the wireless communication device 100 and generates a communication quality detection result accordingly. The wireless communication device 100 is able to detect a distance to another wireless communication device 150 and the channel interference degree at that time. The detection can be implemented in several ways, such as using the high-frequency transceiver circuit 130 to measure the signal strength or the transmission rate of the wireless communication device 150. In addition, the initial transmission rate is another reference. A high initial transmission rate stands for a short distance to the wireless communication device 150 and a low initial transmission rate stands for a long distance to the wireless communication device 150. Other parameters such as the number of false alarms, a scanning result of the power spectrum density (PSD), the number of clear channel assessments (CCA), etc. can also be used as references for channel conditions.

Step S620: selecting one of the candidate sets of transmission rates to be the target set of transmission rates according to the counting result and the communication quality detection result. Following the above example, the counting results determines whether the set of high transmission rates (T201 or T202) or the set of low transmission rates (T203 or T204) should be selected, the communication quality detection result further determines a more specific transmission rate suitable for the current communication environment among the sets of high transmission rates or the sets of low transmission rates.

For example, if the counting result shows that the number of data packets transmitted at high transmission rate exceeds the threshold value, which implies collisions are many, and the communication quality detection result shows that the signal strength is larger than another threshold value, e.g., 60%, a communication environment of short distance and many collisions is determined in this situation. Therefore the target set of transmission rates should be selected from the candidate sets of transmission rates, T201 and T202, whichever has retry transmission rates that decrease slower as the retry times increase. For example the initial and retry transmission rates are respectively a high transmission rate, a high transmission rate, a high transmission rate, and a medium transmission rate, i.e., a high transmission rate is still used at the second retry, so that the data packets can be transmitted more efficiently. If, on the other hand, the counting result shows that the number of data packets transmitted at high transmission rate exceeds the threshold value, but the communication quality detection result indicates that the signal strength is only 40%, which is smaller than the threshold value, a communication environment of long distance is determined in this situation. Therefore the target set of transmission rates should be selected from the candidate sets of transmission rates, T201 and T202, whichever has retry transmission rates that decrease faster as the retry times increase. For example, the initial and retry transmission rates are respectively a high transmission rate, a medium transmission rate, a medium transmission rate, and a low transmission rate, i.e., the data packets will have a greater change to be successfully transmitted to the wireless communication device 150 at a lower transmission rate to overcome the long distance.

Figure 7:
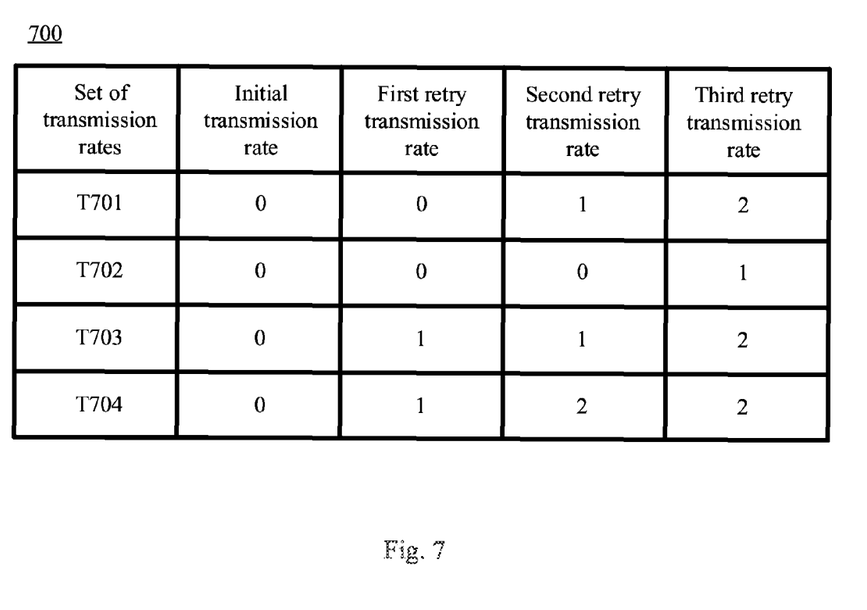
FIG. 7 illustrates sets of transmission rates according to another embodiment of the present invention.

In a preferred embodiment, the table 200 can be presented in a manner of relative transmission rates. Please refer to FIG. 7, illustrating sets of transmission rates according to another embodiment of the present invention. The initial transmission rate of each set of transmission rates is represented by 0, and the numbers corresponding to the retry transmission rates stand for rank differences with respect to the initial transmission rate. For example, if the initial transmission rate of the set of transmission rates T701 is a high transmission rate, the transmission rates of the first, second, and third retry are respectively a high transmission rate, a medium transmission rate and a low transmission rate. In short, the table 700 is the same as the table 200 in meaning but the recordation of relative transmission rates instead of absolute transmission rates saves storage space. Once the initial transmission rate is determined, all other transmission rates in the same set of transmission rates can then be determined.

Figure 8:
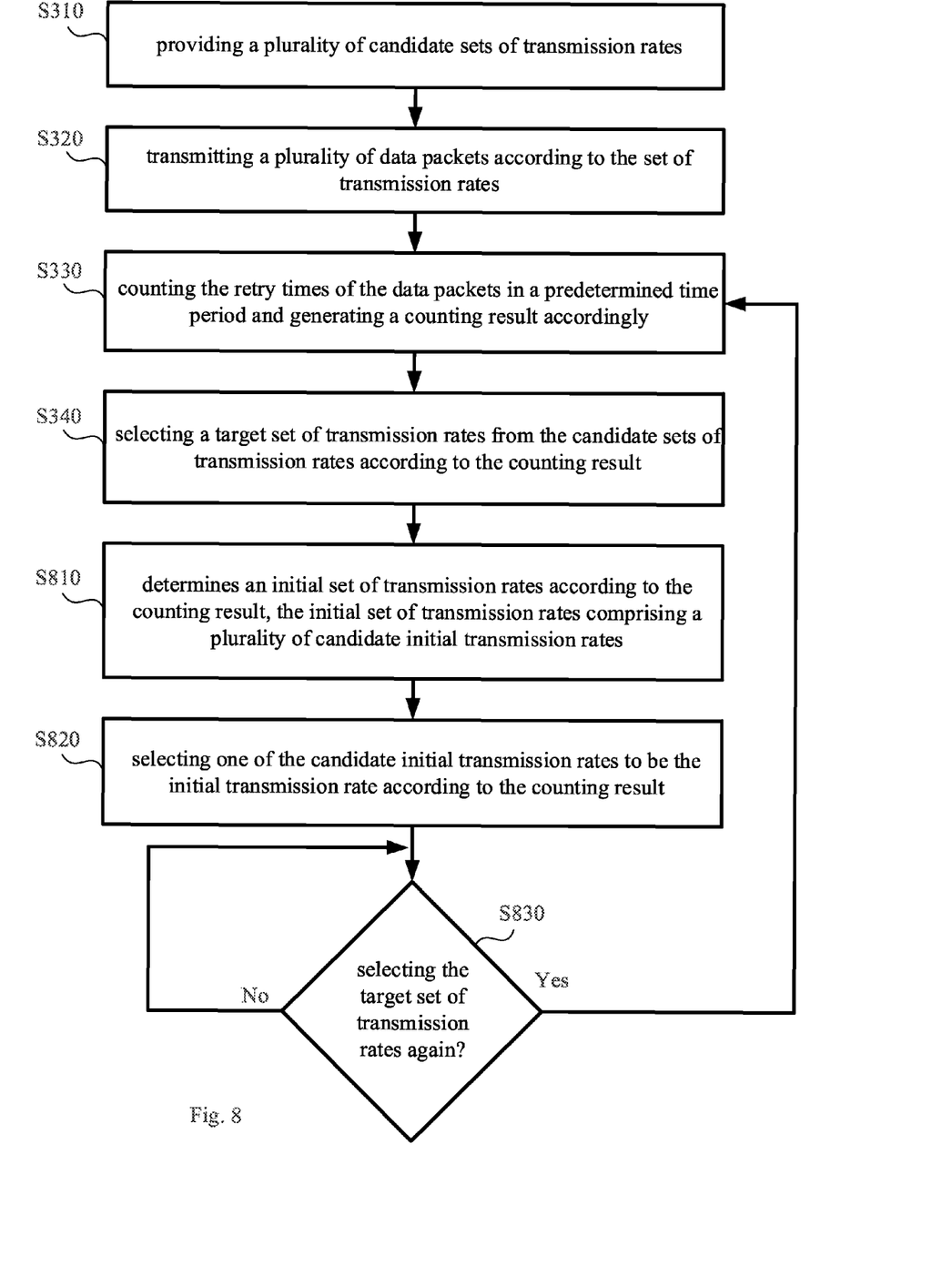
FIG. 8 illustrates a flow chart of deciding a set of transmission rates of a wireless communication device according to another embodiment of the present invention.

The initial transmission rate of any set of transmission rates can be determined in advance or be dynamically determined by the initial transmission rate determining module 125 according to the communication environment at that time. Please refer to FIG. 8, illustrating a flow chart of deciding a set of transmission rates of a wireless communication device according to another embodiment of the present invention. In addition to the steps of FIG. 3, this embodiment further includes the following steps.

Step S810: The initial transmission rate determining module 125 determines an initial set of transmission rates according to the counting result. The initial set of transmission rates comprises a plurality of candidate initial transmission rates. Taking the wireless transmission standard of IEEE 802.11g for example, it defines 8 transmission rates which are, from low to high, 6 MHz, 9 MHz, 12 MHz, 18 MHz, 24 MHz, 36 MHz, 48 MHz, and 54 MHz. The table shown in FIG. 9 comprises initial sets of transmission rates T901~T904, each comprising a plurality of candidate initial transmission rates. For example, the initial set of transmission rates T901 comprises all candidate initial transmission rates, and the initial set of transmission rates T902 comprises two candidate initial transmission rates, 54 MHz and 48 MHz. In a preferred embodiment, when the counting result indicates that the number of data packets transmitted at high transmission rate exceeds the threshold value, the initial transmission rate determining module 125 selects an initial set of transmission rates having high transmission rates, such as the initial sets of transmission rates T901, T902, and T903; and Step S820: selecting one of the candidate initial transmission rates to be the initial transmission rate according to the counting result.

Figure 9:
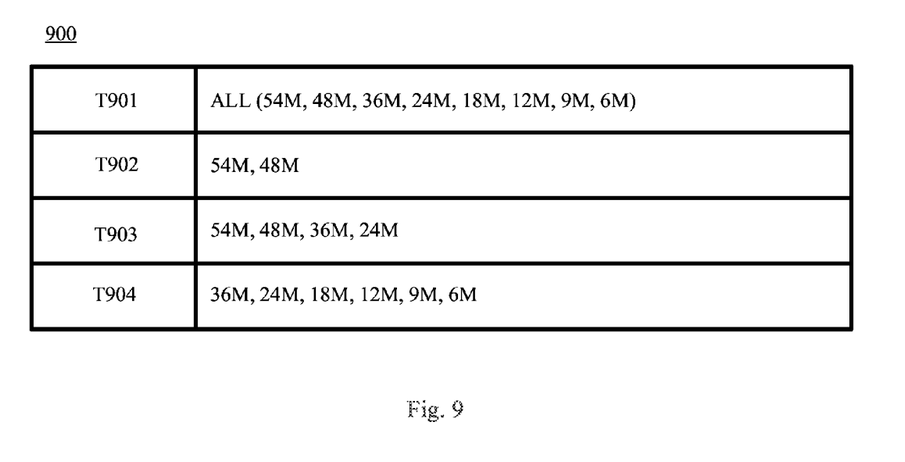
FIG. 9 illustrates an example of the initial sets of transmission rates according to an embodiment of the present invention.
Figure 10:
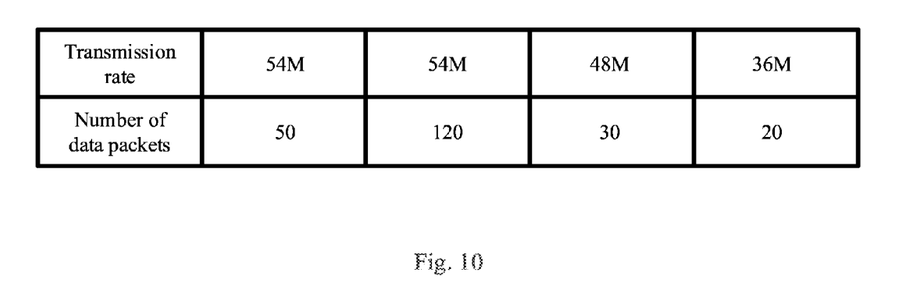
FIG. 10 illustrates an example of the counting result of the data packets transmission times according to the present invention.

To be more specific, assuming that the step S320 uses a predetermined initial transmission rate of 54 MHz, and uses the set of transmission rates T701 as the primary set of transmission rates, the wireless communication device 100 will transmit data packets at an initial transmission rate of 54 MHz, and when the retry process are required, it uses transmission rates 54 Hz, 48 MHz, and 36 MHz in order, according to the retry transmission rates, to transmit the data packets again. After a period of time, in the step S303, a counting result will be obtained. Taking the counting result of FIG. 10 for example, because the number of data packets transmitted at 54 MHz is 170, which is more than 70% of all data packets, and it is assumed that the transmission rate of the wireless communication device 150 detected by the wireless communication device 100 exceeds a threshold value, e.g., 48 MHz, the communication environment at that time is of short distance and many collisions. Thus in step S340 the transmission rate set determining module 123 can select the set of transmission rates T702 as a basis, according to which the subsequent transmission rates will be decided. In step S810, the initial transmission rate determining module 125 will select the initial set of transmission rates T902 from the table 900 according to the communication environment of short distance and many collisions at that time. In step S820, the initial transmission rate determining module 125 will select one of the available initial transmission rates to be the initial transmission rate. Because the transmission rates comprised in the initial set of transmission rates T902 are high transmission rates, either 54 MHz or 48 MHz is selected as the initial transmission rate, the transmission efficiency will be improved. On the contrary, if the transmission rate of the wireless communication device 150 detected by the wireless communication device 100 is lower than the above-mentioned threshold value, it is implied that the wireless communication device 100 is distant from the wireless communication device 150. As a result, in step S810, the initial transmission rate determining module 125 may select the initial set of transmission rates T904 from the table 900 according to the communication environment of long distance and many collisions at that time. In summary, deciding the initial transmission rate again according to the counting result and/or the communication quality detection result makes the wireless communication device 100 transmit data packets depending more closely on the communication environment at that time, improving the overall transmission efficiency.

For a communication system, the communication environment may change frequently. For example, a user may move his/her laptop so frequently that a distance from the laptop to a wireless base station varies and therefore the set of transmission rates and the initial transmission rate must be decided again. As a result, the flow chart of FIG. 8 further comprises step S830. In step S830, the re-detection determining module 127 determines whether steps S330~S340 and steps S810~S820 should be processed again or not according to certain conditions. In a preferred embodiment, the conditions may comprise: (1) deciding the set of transmission rates again every a predetermined time, e.g., every 10 or 20 seconds; (2) a significant change in the signal strength of the wireless communication device 150; and (3) a significant change in the transmission rate of the wireless communication device 150. There may be some other conditions, such as a change in the number of false alarms, a presence or absence of abnormal signal in a PSD scan result, a change in the number of CCA, a change in the distribution of retry data packets, etc. When deciding to detect the current communication environment again, the re-detection determining module 127 sends control signals to the retry packet detection module 122 to make it refresh the counting result.

Figure 11:
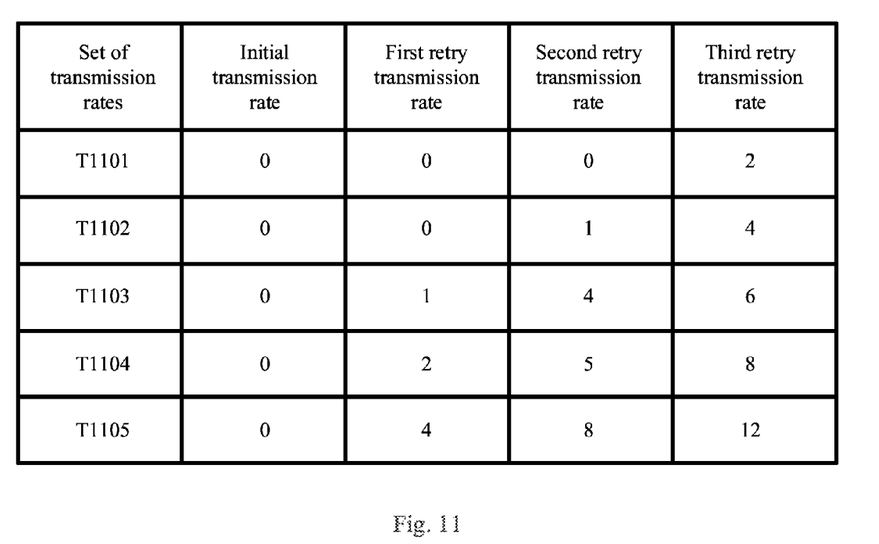
FIG. 11 illustrates a plurality of sets of transmission rates according to another embodiment of the present invention.
Figure 12:
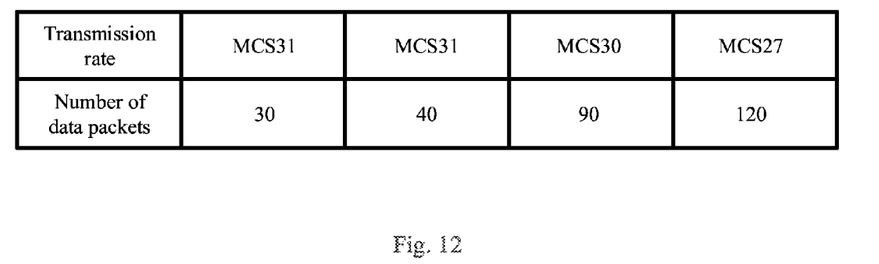
FIG. 12 illustrates an example of the counting result of the data packets transmission times according to the present invention.
Figure 13:
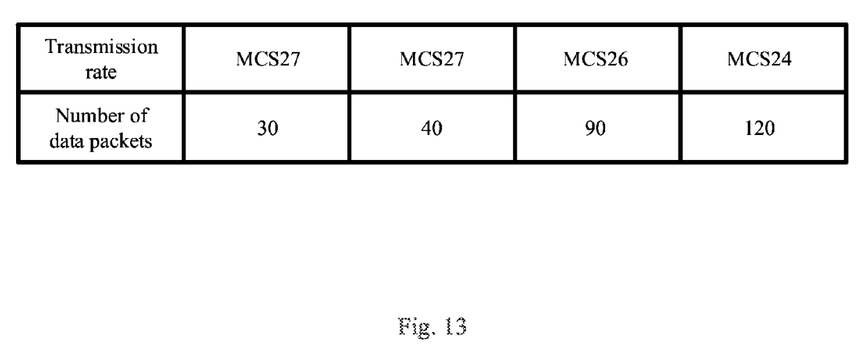
FIG. 13 illustrates an example of the counting result of the data packets transmission times according to the present invention.

The wireless transmission standard of IEEE 802.11n defines 32 transmission rates which are denoted by MCS0~MCS31. The transmission rates are no many that when the wireless communication device 100 adopts the wireless transmission standard of IEEE 802.11n, the table of retry transmission rates will not be as simple as the table 700. Please refer to FIG. 11, illustrating a plurality of sets of transmission rates according to another embodiment of the present invention. Assuming that the initial transmission rate determining module 125 decides the initial transmission rate to be MCS31 and the primary transmission rate set determining module 121 selects the set of transmission rates T1102, the first transmission will be conducted at the transmission rate of MCS31, and the first, second and third retries will respectively be conducted at MCS31, MCS30 and MCS27. It is also assumed that the counting result obtained in step S330 is shown as FIG. 12. Because the number of data packets transmitted at MCS31 is 70, which is less than the threshold value, e.g., 70% of total data packets, and the initial transmission rate in use (MCS31) is higher than the threshold value, e.g., MCS28, the communication environment will be determined to be an environment of low SNR. Since the initial transmission rate is very high, the wireless communication device 100 will select the set of transmission rates T1105 to be the new set of transmission rates. Because the set of transmission rates T1105 will decrease the retry transmission rates more rapidly during the retry process, it will be easier for the wireless communication device 150 to receive the data packets. On the contrary, if the wireless communication device 100 initial selects MCS27 as the initial transmission rate, and the counting result at that time is shown in FIG. 13, whose distribution of retry data packets is the same as that of FIG. 12 but transmission rates are different, the wireless communication device 100 will select the set of transmission rates T1103 or T1104 for the retry process of data packets. The retry transmission rates decrease slower in the set of transmission rates T1103 or T1104, which prevents the transmission rates from dropping too low.

Figure 14:
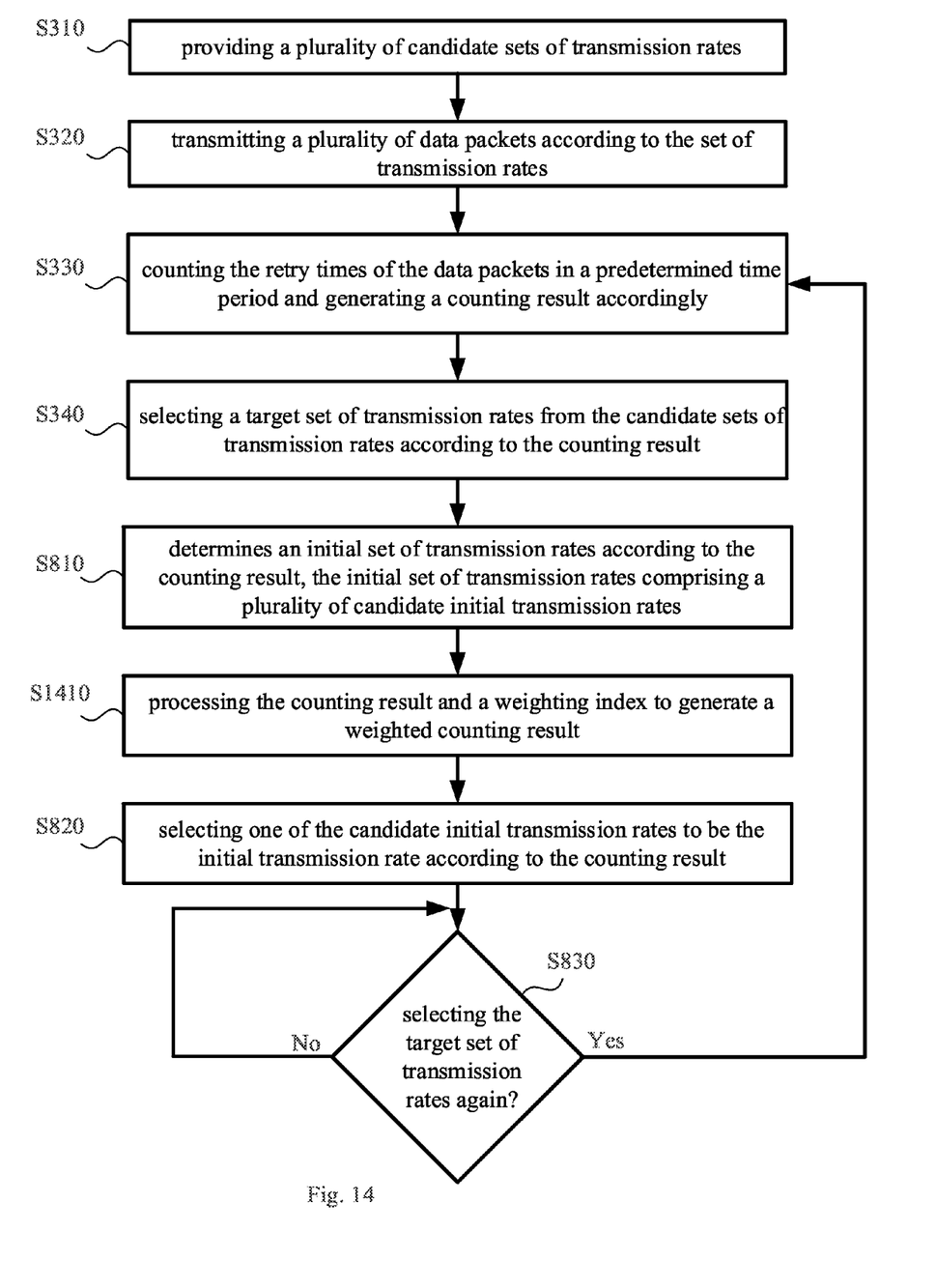
FIG. 14 illustrates a flow chart of deciding a set of transmission rates of a wireless communication device according to another embodiment of the present invention.
Figure 15:
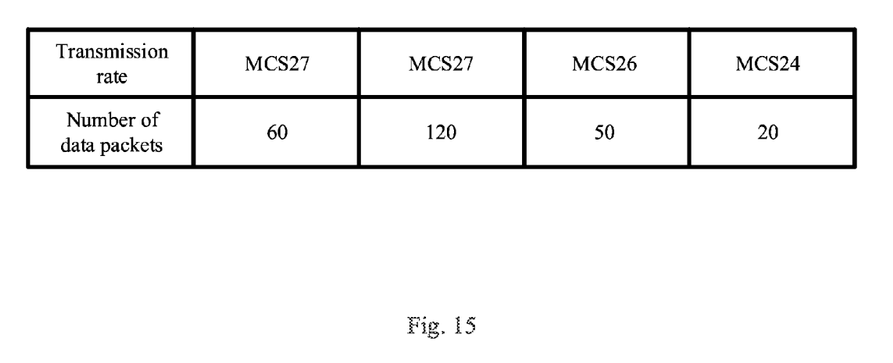
FIG. 15 illustrates an example of the counting result of the data packets transmission times according to the present invention.
Figure 16:
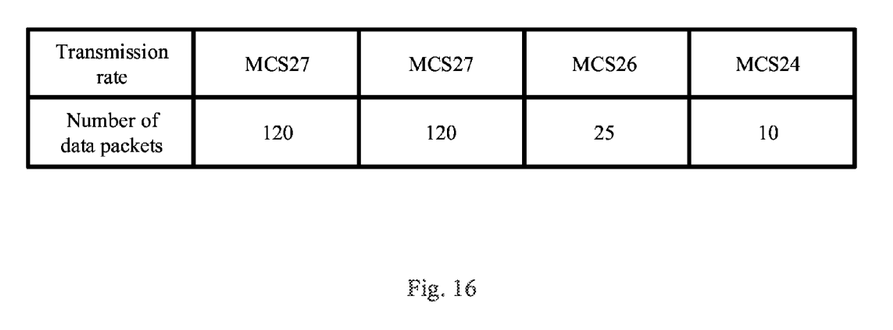
FIG. 16 illustrates an example of the weighted counting result according to the present invention.

Please refer to FIG. 14, illustrating a flow chart of deciding a set of transmission rates of a wireless communication device according to another embodiment of the present invention. Compared with the embodiment illustrated in FIG. 8, an additional step S1410 is introduced between step S810 and step S820 in the flow chart of this embodiment. In step S1410, the weighting operating module 126 processing the counting result and a weighting index to generate a weighted counting result. If, however, the communication quality detection result is obtained as well as the counting results, the weighted counting result is generated according to both the communication quality detection result and the counting result. Assuming that the original counting result is shown in FIG. 15, the communication environment is determined to have many collisions because the number of data packets transmitted at high transmission rate exceeds the threshold value. Since most data packets experience one retry, the weighting operating module 126 gives weightings to the counting result shown in FIG. 15 to prevent the initial transmission rate determining module 125 from selecting a transmission rate lower than the current initial transmission rate MCS27 to be a new initial transmission rate when deciding the initial transmission rate in step S820. For example, 4 different weightings, e.g., 2, 1, 0.5, 0.5, are given to the four transmission rates to generate the new counting result shown in FIG. 16. As a result, in step S820 the initial transmission rate determining module 125 will have a greater chance to select a transmission rate higher than MCS27 to be the initial transmission rate. In a preferred embodiment, when the number of data packets transmitted in high transmission rate exceeds the threshold value, i.e., many collisions occur, step S1410 uses weightings to adjust the counting result.

Since people of ordinary skill in the art can appreciate the implementation detail and the modification thereto of the present method invention of FIGS. 3, 6, 8, and 14 through the disclosure of the device invention of FIG. 1, repeated and redundant description is thus omitted. Please note that there is no step sequence limitation for the method inventions as long as the execution of each step is applicable. Furthermore, the shape, size, and ratio of any element and the step sequence of any flow chart in the disclosed figures are just exemplary for understanding, not for limiting the scope of this invention. Besides, each aforementioned embodiment may include one or more features; however, this doesn't mean that one carrying out the present invention should make use of all the features of one embodiment at the same time, or should only carry out different embodiments separately. In other words, if an implementation derived from one or more of the embodiments is applicable, a person of ordinary skill in the art can selectively make use of some or all of the features in one embodiment or selectively make use of the combination of some or all features in several embodiments to have the implementation come true, so as to increase the flexibility of carrying out the present invention.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A method of deciding a target set of transmission rates of a wireless communication device, which transmits data packets according to a plurality of transmission rates of the target set of transmission rates, comprising:
providing a plurality of candidate sets of transmission rates;
transmitting a plurality of data packets according to a primary set of transmission rates;
counting retry times of the data packets in a predetermined time period and generating a counting result accordingly; and selecting one of the candidate sets of transmission rates to be the target set of transmission rates according to the counting result;

wherein the counting result is relevant to probability of the data packets encountering collision, the candidate sets of transmission rates comprise at least a candidate set of high transmission rates and a candidate set of low transmission rates, an average of the transmission rates of the candidate set of high transmission rates is larger than an average of the transmission rates of the candidate set of low transmission rates, and the step of selecting one of the candidate sets of transmission rates to be the target set of transmission rates according to the counting result comprises:

selecting the candidate set of high transmission rates to be the target set of transmission rates if the counting result indicates that the collision probability of the data packets is larger than a predetermined value; and selecting the candidate set of low transmission rates to be the target set of transmission rates if the counting result indicates that the collision probability of the data packets is smaller than a predetermined value.

2. The method of claim 1, further comprising:
detecting a communication quality of the wireless communication device to generate a communication quality detection result;

wherein, the step of selecting one of the candidate sets of transmission rates to be the target set of transmission rates according to the counting result further comprises:
deciding the target set of transmission rates according to the communication quality detection result.

3. The method of claim 2, wherein the candidate sets of transmission rates comprise a plurality of candidate sets of high transmission rates or a plurality of candidate sets of low transmission rates and the step of deciding the target set of transmission rates according to the communication quality detection result comprises:
selecting one of the candidate sets of high transmission rates or the candidate sets of low transmission rates to be the target set of transmission rates according to the communication quality detection result.

4. The method of claim 2, wherein the wireless communication device communicates with a target wireless communication device and the step of detecting the communication quality of the wireless communication device comprises:
detecting a transmission rate of the target wireless communication device.

5. The method of claim 2, wherein the primary set of transmission rates comprises an initial transmission rate and a plurality of retry transmission rates, the wireless communication device utilizes the initial transmission rate for transmitting a data packet for the first time and optionally utilizes one of the retry transmission rates to transmit the same data packet again, and the step of detecting the communication quality of the wireless communication device comprises:
generating the communication quality detection result by referring to the initial transmission rate.

6. The method of claim 1, wherein the primary set of transmission rates comprises an initial transmission rate and a plurality of retry transmission rates, the wireless communication device utilizes the initial transmission rate to transmit a data packet for the first time and optionally utilizes one of the retry transmission rates to transmit the same data packet again, and at least one of the retry transmission rates is the same as the initial transmission rate.

7. The method of claim 1, further comprising:
deciding an initial transmission rate according to the counting result;
wherein the transmission rates are decided according to the initial transmission rate.

8. The method of claim 7, wherein the step of deciding an initial transmission rate according to the counting result comprises:
deciding an initial set of transmission rates according to the counting result, the initial set of transmission rates comprising a plurality of candidate initial transmission rates; and
selecting one of the candidate initial transmission rates to be the initial transmission rate according to the counting result.

9. The method of claim 7, further comprising:
processing the counting result with a weighting index to generate a weighted counting result;
wherein the step of deciding an initial transmission rate according to the counting result decides the initial transmission rate according to the weighted counting result.

10. The method of claim 1, further comprising:
determining whether to select the target set of transmission rates again according to a condition.

11. The method of claim 10, wherein the wireless communication device communicates with a target wireless communication device, and the condition is relevant to a transmission rate of the target wireless communication device.

12. The method of claim 10, wherein the condition is whether a predetermined time is reached.

13. A wireless communication device comprising:
a storage unit for storing a plurality of candidate sets of transmission rates, each comprising a plurality of transmission rates;
a high-frequency transceiver circuit; and
a processing unit, coupled to the storage unit and the high-frequency transceiver circuit, for accessing the sets of transmission rates and controlling the high-frequency transceiver circuit to transmit a plurality of data packets, comprising:
a primary transmission rate set determining module for selecting one of the candidate sets of transmission rates to be a primary set of transmission rates, wherein the processing unit controls the high-frequency transceiver circuit to transmit a part of the data packets according to the primary set of transmission rates;
a retry packet detection module for counting retry times of the data packets to generate a counting result; and
a transmission rate set determining module for selecting one of the candidate sets of transmission rates to be a target set of transmission rates according to the counting result, wherein the processing unit controls the high-frequency transceiver circuit to transmit the remaining data packets according to the target set of transmission rates;
wherein the counting result is relevant to probability of the data packets encountering collision, the candidate sets of transmission rates comprise at least a set of high transmission rates and a set of low transmission rates, an average of the transmission rates of the set of high transmission rates is larger than an average of the transmission rates of the set of low transmission rates, and if the transmission rate set determining module determines that the collision probability of the data packets is larger than a predetermined value, the transmission rate set determining module selects the set of high transmission rates to be the target set of transmission rates, and if the transmission rate set determining module determines that the collision probability of the data packets is smaller than a predetermined value, the transmission rate set determining module selects the set of low transmission rates to be the target set of transmission rates.

14. The wireless communication device of claim 13, wherein the processing unit further comprises:
a communication quality detecting module for detecting a communication quality of the wireless communication device to generate a communication quality detection result;
wherein the transmission rate set determining module further refer to the communication quality detection result to decide the target set of transmission rates.

15. The wireless communication device of claim 14, wherein the candidate sets of transmission rates comprise a plurality of candidate sets of high transmission rates or a plurality of candidate sets of low transmission rates, and the transmission rate set determining module selects one of the candidate sets of high transmission rates or the candidate sets of low transmission rates to be the target set of transmission rates according to the communication quality detection result.

16. The wireless communication device of claim 14, wherein the wireless communication device communicates with a target wireless communication device and the communication quality detecting module detects a transmission rate of the target wireless communication device.

17. The wireless communication device of claim 14, wherein the primary set of transmission rates comprises an initial transmission rate and a plurality of retry transmission rates, the wireless communication device utilizes the initial transmission rate for transmitting a data packet for the first time and optionally utilizes one of the retry transmission rates to transmit the same data packet again, and the communication quality detecting module generates the communication quality detection result by referring to the initial transmission rate.

18. The wireless communication device of claim 13, wherein the primary set of transmission rates comprises an initial transmission rate and a plurality of retry transmission rates, the wireless communication device utilizes the initial transmission rate to transmit a data packet for the first time and optionally utilizes one of the retry transmission rates to transmit the same data packet again, and at least one of the retry transmission rates is the same as the initial transmission rate.

19. The wireless communication device of claim 13, wherein the processing unit further comprises:
an initial transmission rate determining module for deciding an initial transmission rate according to the counting result;
wherein the transmission rates are decided according to the initial transmission rate.

20. The wireless communication device of claim 19, wherein the initial transmission rate determining module decides an initial set of transmission rates according to the counting result, the initial set of transmission rates comprising a plurality of candidate initial transmission rates and selects one of the candidate initial transmission rates to be the initial transmission rate according to the counting result.

21. The wireless communication device of claim 19, wherein the processing unit further comprises:
a weighting operating module for processing the counting result with a weighting index to generate a weighted counting result;
wherein the initial transmission rate determining module decides the initial transmission rate according to the weighted counting result.

22. The wireless communication device of claim 13, wherein the processing unit further comprises:
a re-detection determining module for determining whether to select the target set of transmission rates again according to a condition.

23. The wireless communication device of claim 22, wherein the wireless communication device communicates with a target wireless communication device, and the condition is relevant to a transmission rate of the target wireless communication device.

24. The wireless communication device of claim 22, wherein the condition is whether a predetermined time is reached.

* * * * *